though this invention is susceptible of various embodiments within the scope of the appended claims.

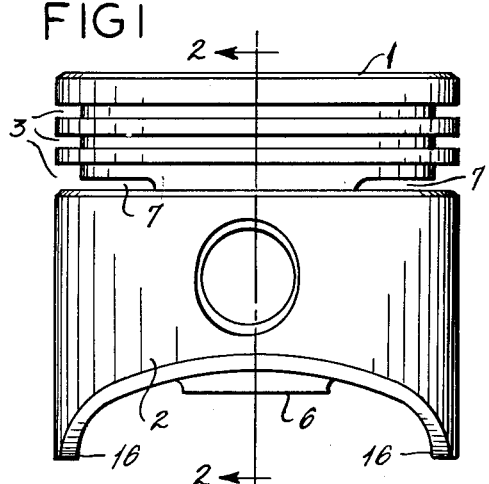
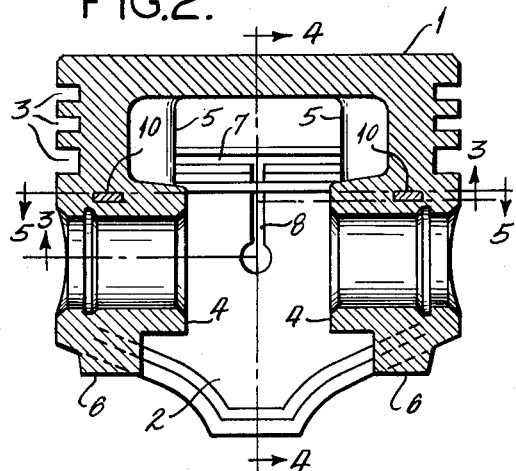
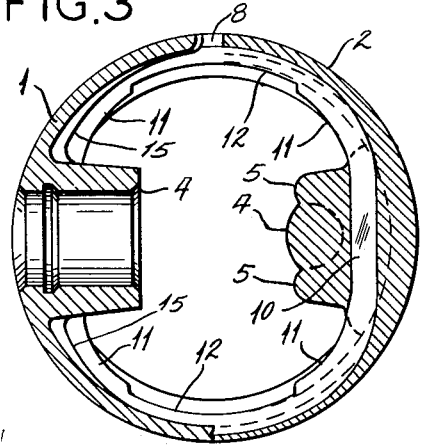
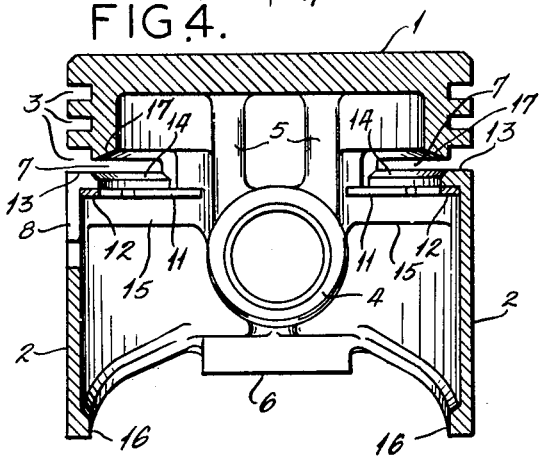
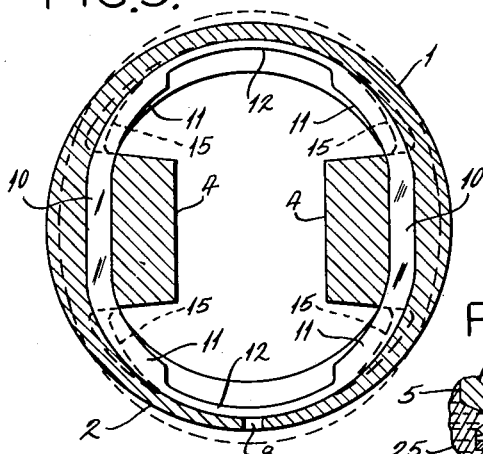
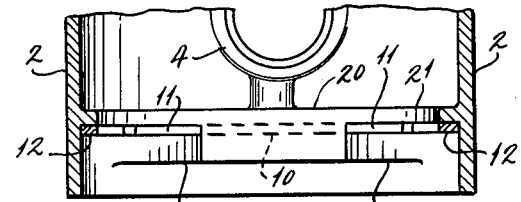
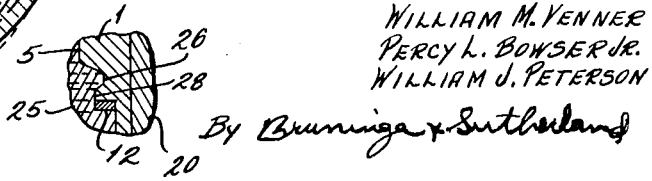
INVENTOR:
WILLIAM M. VENNER
PERCY L. BOWSER JR.
WILLIAM J. PETERSON
ATTORNEYS.

United States Patent Office 2,737,427
Patented Mar. 6, 1956

2,737,427

TRUNK PISTON

William M. Venner, Clayton, Percy L. Bowser, Jr., Ladue, and William F. Peterson, Creve Coeur, Mo.; said Venner and said Bowser, Jr., assignors to Sterling Aluminum Products, Inc., St. Louis, Mo., a corporation of Missouri Application August 29, 1952, Serial No. 306,976

8 Claims. (Cl. 309—13)

This invention relates to trunk pistons, particularly of a type designed for use in internal combustion engines for automobiles. Such pistons are usually constructed of a metal of relatively high thermal expansion, such as aluminum and magnesium alloys containing various alloying elements such as copper, silicon, nickel, manganese, etc. Where silicon is employed on the order of 12%, the thermal expansion is materially reduced. Copper, nickel and manganese impart hardness and strength to the alloy. The temperatures encountered in internal combustion engines are however, high, so that there is liability of seizure when hot and a looseness when cold.

A trunk piston of the type described comprises a head, a skirt, and wrist pin bosses on the inside of the skirt. The head is grooved to receive the piston rings and is of smaller diameter than the skirt, which provides the guiding cross-head for the piston. The skirt is separated from the head in one or both regions of the thrust faces by circumferential slots. The skirt may be of circular contour but is usually made oval with the major diameter in the regions of the thrust faces and with the minor diameter in the regions of the bosses. Some pistons have vertical slots. Furthermore, the piston is also relieved in the regions of the bosses. The skirt is usually given a standard taper with a smaller diameter at the top.

One of the objects of this invention is to provide a piston of the type described whereby the expansion of the piston may be controlled so as to maintain a close fit in the cylinder, whether the piston be hot or cold.

Further objects will appear from the detailed description in which will be set out an illustrative embodiment of this invention; it is to be understood however, that this invention is susceptible of various embodiments within the scope of the appended claims.

Referring to the drawing, Figure 1 is a side view of a piston embodying this invention;

Figure 2 is a section on the line 2—2, Figure 1;
Figure 3 is a section on the line 3—3, Figure 2;
Figure 4 is a section on the line 4—4, Figure 2;
Figure 5 is a diagrammatical view on the line 5—5, Figure 2, and illustrating the principle of this invention;
Figure 6 is a partial sectional view similar to Figure 4, but showing another embodiment of this invention, and
Figure 7 is a detail sectional view similar to the right part of Figure 4 showing a part of the casting before circumferential slotting.

Generally stated, and in accordance with an illustrative embodiment of this invention, a trunk piston of a metal of relatively high thermal expansion and comprising a head, a skirt provided with wrist pin bosses, and with thrust faces axially separated from the head in one or both thrust face regions, is provided with a control element of a metal of relatively low thermal expansion, lying within and extending completely around the top of the skirt rigidly anchored in the regions of the bosses, but unanchored radially in the regions of the thrust faces. The control element may be of greater rigidity axially in the regions of the bosses than in the regions of the thrust faces, and such greater rigidity may extend partially into the regions of the thrust faces.

In the method of making such a trunk piston, the head and skirt of the high thermal expansion metal, are cast over the control element or ring of relatively low thermal expansion, positioned inside of the skirt with the piston metal surrounding and anchoring the ring radially in the regions of the bosses, but leaving the ring exposed internally and unanchored radially in the regions of the thrust faces; thereafter the casting metal is permitted to solidify and cool so as to stress the metal and the ring; thereafter, the skirt is separated axially from one or both heads in the thrust face regions so as to cause the separated thrust face or faces to move outwardly; the piston is then finished in the usual manner. Almost universally, such pistons are cast in permanent or metal molds, so as to require no machining at all on the inside of the piston and very little machining on the outside of the piston.

In the piston described, the control element is, as noted above, of a metal of relatively low thermal expansion. This ring may be made of cold rolled steel which has about the same co-efficient of thermal expansion as has the cylinder wall. However, the control element or ring, may be made of a steel or metal having a very low co-efficient of expansion, approaching zero. Such steel is well-known and has heretofore been employed as control elements for aluminum and magnesium alloy pistons.

Referring now to the accompanying drawing and more particularly to Figures 1–4, 1 designates the head and 2 the skirt of a piston of the type described. The head, which is made somewhat smaller than the skirt, is provided with packing ring grooves 3 while the skirt is provided with inwardly extending wrist pin bosses 4. There may also be ribs 5, extending from the bosses to the head to give additional strength. The skirt itself however, is made thin, particularly in the regions of the thrust faces and may also be externally relieved in the boss regions and provided at the bottom with the usual balancing lugs 6. The head is separated from the skirt in the regions of the thrust faces by semi-circumferential slots 7, but remains attached in the regions of the bosses. This slotting 7, may be on one or both sides of the piston, and the piston may be further provided with a vertical slot 8, in one or both thrust faces of the skirt. However, such vertical slotting is not necessary in the piston embodying this invention.

Referring to Figure 3, the control element, generally indicated at 10, is made of a metal of relatively low thermal expansion. As shown, it is in the form of a ring which may be a stamping. In the regions of the bosses the ring is made of relatively high radial depth as shown at 11, but in the regions of the thrust faces this ring is made of relatively low radial depth as shown at 12, thus providing a ring of greater rigidity on a pair of opposite sectors than on a pair of opposite sectors at right angles to the first named pair. The sectors 11 of greater rigidity and cast in the wrist pin boss regions, are preferably made to extend into the thrust face regions. As an example, each sector 12, may encompass an arc of about thirty degrees.

The control ring shown in Figure 3, and as just described, is cast into the piston in the position shown in Figures 2, 3, 4 and 7. Its position is at the top of the skirt and below the circumferential slots 7, later produced. In that position the control ring is cast wholly within the metal of the skirt in the regions of the bosses and rigidly cast-anchored therein, but it simply lies against the skirt and is radially unanchored in the regions of the thrust faces. In the piston above the control ring there are ledges 13 which are reduced radially at the top by beveling as shown at 14, while the piston head above the slot 7 is beveled at 17. In making the casting Figure 7, an overhang 26 on the core 25 extends to a radius greater than that at the bottom of the later-to-be-cut lowest ring groove 3 with a recess 28 below the overhang to form the ledge 13 and the bevels 14 and 17, Figure 4. Below the control ring there are tapering ledges 15 from the bosses and vanishing into the centers of the thrust faces as shown in Figures 3, 4 and 5.

Referring now to Figures 5 and 7, in making this piston the control ring is placed in a mold in which the position is to be cast with the ring positioned at the top of what will form the skirt of the piston. To accomplish this, the ring is placed on the usual core, which may be a five piece core with a three-piece center core and a pair of side cores having recesses to form the wrist pin bosses, and which may be of a type shown in U. S. Patent 2,676,372. The core is recessed to receive the control ring 10 which may be placed over the core when collapsed. In Fig. 7 the core part 25 is shown recessed to receive the control ring and the recess 28 over the ring sector 12 forms the ledge 13 on the piston, while the overhang 26 on the core forms a recess extending into the later-to-be-cut lowest ring groove, to form the circumferential slot 7 in the region of the thrust face. At this time, however, the circumferential slots 7 will be absent, as will also be the ring grooves 3. At that time the skirt including the ledge 13 is a part of and connected to the head. The cutting of the lowest ring groove 7 will cut through the ledge recess left by the overhang 26 to produce the slot 7. The opposite thrust face will be likewise formed.

After the piston has been cast, but before the slots 7 are cut, the parts will be in the position shown in full lines in Figure 5; i. e. solidifying and cooling from molten to cold condition the casting metal will shrink much faster than will the steel ring so that the piston metal will contract to finally arrive at a condition of tension. In so doing, the steel ring is stressed, viz., placed under compression radially as well as circumferentially. When now the circumferential slots 7 are cut, the steel and the piston metal will both move out so as to form an oval contour of the piston as shown in dotted lines in Figure 5, because the strain is partially relieved in the region of the thrust faces and particularly because the sectors 12 at those faces are reduced in radial depth. However, the piston metal will remain partly under tension while the ring will remain partly under compression and under radial stress. It will, of course be understood that the oval shown is exaggerated for illustrative purposes because the actual distortion is small. The piston is now machined to size with the skirt of the usual round, or oval contour; an oval form where employed, has its major diameter on the thrust face axis and its minor diameter on the wrist pin axis. Reliefs may, however, be cast in the regions of the bosses as is usual in many pistons. The steel ring will, however, remain oval (slightly) until in use in the engine; until then the piston metal will remain partly under tension while the ring will remain partly under compression. The method and mold with its cores are more fully described and claimed in Application Serial No. 308,408 filed September 9, 1952.

A piston of the construction described and made as described can be made with a very low clearance and it will still maintain a close fit when either hot or cold. That is for the following reason: As the piston heats up the head will of course expand radially in all directions. Such radial expansion of the head will, however, only be transmitted to the skirt in the regions of the bosses. That will tend to relieve some of the strain along the wrist pin axis so that the piston metal and the steel ring will move out along the axis. That will cause the ring to tend to return to its original (viz., round) form. In so doing, the strain in the piston metal at the thrust faces is also relieved so as to move in with the steel ring at those faces. The piston, even one of an aluminum alloy, will therefore remain conformed to the cylinder with a very low clearance, even below 0.001 inch. The sectors 11 are rigidly anchored in the thrust faces because the metal is cast entirely therearound. Because of the construction of the ring, it takes generally the form of cantilevers anchored in the boss regions and extending into the thrust face regions. The piston metal does not, however, surround the sectors 12 but only lies against the outside of the sectors and in the particular embodiment shown, against one of the sides (upper, Fig. 4) of those sectors except for the tapering ledges 15 from the bosses and vanishing into the centers of the thrust faces on the (lower) side of the ring. However, as will be seen from Fig. 3, the ledges 15 are very narrow, so that any gripping of the ring sectors 12 and even into 11, by the ledges after solidification will be slight. Accordingly the control ring while anchored radially and axially in the regions of the bosses will be unanchored radially and axially in the regions of the thrust faces, so that the thrust faces will always move in with the ring as the piston temperature increases when in use in the engine. The control ring at the thrust face or faces and the alloy thereover, are therefore under stress when the piston is cold, which stress will be progressively relieved as the piston heats up in the engine, the whole operating to maintain the skirt dimension radially. The skirt at the thrust faces will therefore remain accurately dimensioned by the control ring.

While various designs may be employed, an example of an actual commerical embodiment is shown in the drawing, which is to scale. That is a piston for a diameter at the skirt designed for a 3.670" bore cylinder. From the top of the head to the top of the slot is $^{55}/_{64}$". The control ring 10, of cold rolled steel, has a radial dimension at the sector 11 of 0.25" and at the sector 12 of 0.125". The arc of the sector 12 is 30 degrees. The thickness of the control ring is 0.07". The piston is the usual aluminum, copper, magnesium alloy. The other dimensions are all in proportion.

In the embodiment shown in Figure 6, the upper part of the piston is constructed as in Figures 1–5. The lower part of the skirt is, however, provided with a control ring 10 as in the upper part. This control ring is anchored in a rib 20, cast integral with the skirt in the regions of the bosses, but is not anchored in the regions of the thrust faces but only supported axially between two ledges 21 and 22 cast integral with the rib 20, the ledges 22 being tapered as are the ledges 15 and vanishing into the inside of the skirt. Such a bottom control ring may be cast into the skirt as is the upper control ring. The two control rings may be employed together or separately.

It will therefore be seen that the invention accomplishes its purpose. A piston is provided which can be closely fitted to a cylinder of an internal combustion engine and which will maintain its dimensions from hot to cold so that there will be no seizing when hot and no slapping when cold.

Having thus described the invention, what is claimed and desired to be secured by Letters Patent is:

1. A trunk piston of a metal of relatively high thermal expansion, comprising, a head, a skirt provided with wrist pin bosses and with thrust faces one of which is axially separated from the head in a thrust face region, and a control element of a metal of relatively low thermal expansion lying within and extending completely around the top of the skirt, rigidly anchored in the regions of the bosses, but unanchored radially in the separated thrust face, said control element and the piston metal thereover being under stress when the piston is cold, which stress will be progressively relieved as the piston heats up in the engine, adapted to maintain the skirt dimension diametrically.

2. A trunk piston of a metal of relatively high thermal expansion, comprising, a head, a skirt provided with wrist pin bosses and with thrust faces one of which is axially separated from the head in a thrust face region, and a control element of a metal of relatively low thermal expansion lying within and extending completely around the top of the skirt, rigidly anchored in the regions of the bosses, but unanchored radially in the regions of the thrust faces, and of greater rigidity axially in the regions of the bosses than in the separated thrust face, said control element and the piston metal thereover being under stress when the piston is cold, which stress will be progressively relieved as the piston heats up in the engine, adapted to maintain the skirt dimension diametrically.

3. A trunk piston of a metal of relatively high thermal expansion, comprising, a head, a skirt provided with wrist pin bosses and with thrust faces one of which is axially separated from the head in a thrust face region, and a control element of a metal of relatively low thermal expansion lying within and extending completely around the top of the skirt, rigidly anchored in the regions of the bosses, but unanchored radially in the separated thrust face, and of greater rigidity axially in the regions of the bosses than in the regions of the thrust faces, such greater rigidity extending partially into the separated thrust face.

4. A trunk piston of a metal of relatively high thermal expansion, comprising, a head, a skirt provided with wrist pin bosses and with thrust faces axially separated from the head in the thrust face regions, and a ring of a metal of relatively low thermal expansion lying within and extending completely around the top of the skirt, cast wholly within the metal of the skirt in the regions of the bosses and rigidly anchored therein but lying against the skirt and unanchored radially in the regions of the thrust faces, said control element and the piston metal thereover being under stress when the piston is cold, which stress will be progressively relieved as the piston heats up in the engine, adapted to maintain the skirt dimension diametrically.

5. A trunk piston of a metal of relatively high thermal expansion, comprising, a head, a skirt provided with wrist pin bosses and with thrust faces one of which is axially separated from the head in a thrust face region, and a ring of a metal of relatively low thermal expansion lying within and extending completely around the top of the skirt, cast wholly within the metal of the skirt in the regions of the bosses and rigidly anchored therein but lying against the skirt and unanchored radially in the separated thrust face, said ring having a radial depth in the regions of the bosses greater than in the separated thrust face.

6. A trunk piston of a metal of relatively high thermal expansion, comprising, a head, a skirt provided with wrist pin bosses and with thrust faces axially separated from the head in a thrust face region, and a ring of a metal of relatively low thermal expansion lying within and extending completely around the top of the skirt, cast wholly within the metal of the skirt in the regions of the bosses and rigidly anchored therein but lying against the skirt and unanchored radially in the regions of the thrust faces, said ring having a radial depth in the regions of the bosses greater than in the regions of the thrust faces, such greater radial depth extending partially into the regions of the thrust faces.

7. A trunk piston of a metal of relatively high thermal expansion, comprising, a head, a skirt provided with wrist pin bosses and with thrust faces one of which is axially separated from the head in a thrust face region, and a control element of a metal of relatively low-thermal expansion lying within and extending completely around the skirt, rigidly anchored in the regions of the bosses but unanchored radially in the regions of the thrust faces, said control element and the piston metal thereover being under stress when the piston is cold, which stress will be progressively relieved as the piston heats up in the engine, adapted to maintain the skirt dimension diametrically.

8. A trunk piston of a metal of relatively high thermal expansion, comprising, a head, a skirt provided with wrist pin bosses and with thrust faces one of which is axially separated from the head in a thrust face region, and a pair of control elements of a metal of relatively low thermal expansion lying within and extending completely around the skirt, rigidly anchored in the one of the bosses but unanchored radially in the separated thrust face, one of said elements being positioned at the top and the other at the bottom of the skirt, said control elements and the piston metal thereover being under stresses when the piston is cold, which stresses will be progressively relieved as the piston heats up in the engine, adapted to maintain the skirt dimension diametrically.

References Cited in the file of this patent

UNITED STATES PATENTS

| | | |
|---|---|---|
| 1,540,306 | Barstow et al. | June 2, 1925 |
| 1,681,621 | Nelson | Aug. 21, 1928 |
| 1,731,904 | Nelson | Oct. 15, 1929 |
| 2,119,137 | Moore | May 31, 1938 |
| 2,221,535 | Berry | Nov. 12, 1940 |
| 2,238,087 | Bowser | Apr. 15, 1941 |
| 2,426,732 | Gates | Sept. 2, 1947 |
| 2,551,488 | Deming | May 1, 1951 |
| 2,576,655 | Venner et al. | Nov. 27, 1951 |

FOREIGN PATENTS

| | | |
|---|---|---|
| 136,581 | Austria | Feb. 26, 1934 |
| 999,157 | France | Jan. 28, 1952 |